(12) United States Patent
Fernandez et al.

(10) Patent No.: US 7,355,621 B1
(45) Date of Patent: Apr. 8, 2008

(54) DIGITAL TELEVISION WITH SUBSCRIBER CONFERENCE OVERLAY

(76) Inventors: Dennis S. Fernandez, 1175 Osborn Ave., Atherton, CA (US) 94027; Irene Y. Hu, 1240 Avon St., Belmont, CA (US) 94002

( * ) Notice: Subject to any disclaimer, the term of this patent is extended or adjusted under 35 U.S.C. 154(b) by 0 days.

(21) Appl. No.: 11/059,611

(22) Filed: Feb. 15, 2005

Related U.S. Application Data

(60) Continuation of application No. 10/444,261, filed on May 22, 2003, now Pat. No. 7,221,387, which is a continuation of application No. 10/026,095, filed on Dec. 21, 2001, now Pat. No. 6,590,602, which is a division of application No. 09/095,390, filed on Jun. 10, 1998, now Pat. No. 6,339,842.

(51) Int. Cl.
*H04N 7/14* (2006.01)
(52) U.S. Cl. .............. 348/14.08; 348/14.09; 348/14.01
(58) Field of Classification Search .. 348/14.01–14.09, 348/14.1, 14.11, 14.12, 14.13, 14.14; 370/260, 370/261; 709/204; 725/133, 141, 183
See application file for complete search history.

(56) References Cited

U.S. PATENT DOCUMENTS

| | | | |
|---|---|---|---|
| 4,360,827 A * | 11/1982 | Braun ................... | 348/14.09 |
| 4,796,293 A * | 1/1989 | Blinken et al. ......... | 379/202.01 |
| 4,847,698 A | 7/1989 | Freeman | |
| 4,918,516 A | 4/1990 | Freeman | |
| 5,038,211 A | 8/1991 | Hallenbeck | |
| RE34,340 E | 8/1993 | Freeman | |
| 5,371,534 A | 12/1994 | Dagdeviren et al. | |
| 5,397,133 A * | 3/1995 | Penzias ................ | 463/22 |
| 5,491,797 A | 2/1996 | Thompson et al. | |
| 5,504,933 A | 4/1996 | Saito | |
| 5,515,099 A | 5/1996 | Cortjens et al. | |
| 5,534,914 A | 7/1996 | Flohr et al. | |
| 5,600,364 A | 2/1997 | Hendricks et al. | |
| 5,635,979 A | 6/1997 | Kostreski et al. | |
| 5,675,375 A | 10/1997 | Riffee | |
| 5,689,553 A | 11/1997 | Ahuja et al. | |
| 5,701,161 A | 12/1997 | Williams et al. | |
| 5,710,815 A * | 1/1998 | Ming et al. ........... | 380/241 |

(Continued)

FOREIGN PATENT DOCUMENTS

GB  2313251 A  11/1997

(Continued)

OTHER PUBLICATIONS

Mitchell, N. "Trimedia White Paper: A Programmable Architecture for Digital Television", 1998 National Association of Broadcasters Convention, Las Vegas NV, Apr. 9, 1998.

(Continued)

*Primary Examiner*—Melur Ramakrishnaiah
(74) *Attorney, Agent, or Firm*—Fernandez & Associates, LLP

(57) ABSTRACT

Digital television system overlays subscriber two-way communication during broadcast program delivery to create virtual audience community. Individual or group billing and advertisement is personalized per DTV receiver program viewing and/or conferencing activity. Subscriber receiver includes camera and other media I/O device for multi-way video conferencing. Participants may be added or removed dynamically during programming or conferencing.

58 Claims, 5 Drawing Sheets

U.S. PATENT DOCUMENTS

| | | | |
|---|---|---|---|
| 5,729,549 | A | 3/1998 | Kostreski et al. |
| 5,734,413 | A | 3/1998 | Lappington et al. |
| 5,795,228 | A * | 8/1998 | Trumbull et al. ............. 463/42 |
| 5,818,513 | A | 10/1998 | Sano et al. |
| 5,828,839 | A * | 10/1998 | Moncreiff ................... 709/204 |
| 5,880,731 | A * | 3/1999 | Liles et al. ................. 715/758 |
| 5,913,040 | A | 6/1999 | Rakavy et al. |
| 5,920,642 | A * | 7/1999 | Merjanian ................... 382/126 |
| 5,966,442 | A | 10/1999 | Sachdev |
| 5,978,855 | A * | 11/1999 | Metz et al. ................. 709/249 |
| 6,023,499 | A | 2/2000 | Mansey et al. |
| 6,038,599 | A * | 3/2000 | Black et al. ................ 709/223 |
| 6,061,399 | A * | 5/2000 | Lyons et al. ................ 375/240 |
| 6,075,553 | A * | 6/2000 | Freeman et al. ......... 348/14.08 |
| 6,081,830 | A * | 6/2000 | Schindler ................... 709/204 |
| 6,133,912 | A * | 10/2000 | Montero ..................... 715/716 |
| 6,243,129 | B1 | 6/2001 | Deierling |
| 6,287,199 | B1 * | 9/2001 | McKeown et al. ........... 463/40 |
| 6,298,088 | B1 * | 10/2001 | Bhatt et al. ............ 375/240.28 |
| 6,396,480 | B1 | 5/2002 | Schindler et al. |
| 6,418,214 | B1 | 7/2002 | Smythe et al. |
| 6,463,585 | B1 * | 10/2002 | Hendricks et al. ............ 725/35 |
| 6,530,840 | B1 | 3/2003 | Cuomo et al. |
| 2002/0059581 | A1 | 5/2002 | Billock et al. |

FOREIGN PATENT DOCUMENTS

| | | |
|---|---|---|
| JP | 02-084177 | 12/1991 |
| JP | 403283982 A | 12/1991 |
| JP | 03-143060 | 12/1992 |
| JP | 40-4367040 A | 12/1992 |
| JP | 05-145918 | 6/1993 |
| JP | 05-091505 | 9/1993 |
| JP | 05-316107 A | 11/1993 |
| JP | 406269004 A * | 9/1994 |
| JP | 05-160913 | 1/1995 |
| JP | 407023356 A | 1/1995 |
| JP | 06-266553 | 5/1996 |
| JP | 08-130724 | 5/1996 |
| JP | 08-222068 | 3/1998 |
| JP | 10-065984 A | 3/1998 |

OTHER PUBLICATIONS

Othman, S.Y., "White Paper: Interactive Data Services for Television, System Design Issues". <http://www.teralogic-inc.com/products/internettv/WhitePaper1/html>. Mar. 1998.

Jones, J. "Projecting the Television Audience in the Digital Future", Vienna, Austria. 1998. <http://www.cpb.org/library/presentations/esomar.html>.

Vedro, S., "Beyond the VBI-High Speed Datacasting and Enhanced TV", info.p@ckets, No. 32, Dec. 1997. <http://www.cpb.org/library/infopackets/packet32.html>.

Yang, Sung-Jin "Samsung, LG Plain Digital TV as new cash cow". The Korea Herald, 2003. 4. 21. <http://www.koreaherald.co.kr/servlet/cms/article.view>.

Hara, Yoshiko. "Japan to begin DTV broadcasts in December", EETimes. 2003, 4. 18. <http://www.eetimes.com/story/OEG2003041850042>.

Battle Forecasts Predicts 10 Most Innovative Products for 2006. <http://www.battle.org/news/96/>.

Management of Multimedia Services; Feb. 1997. EURESCOM Participants in Project P610.

Dawson, F., "Video Perks Give Data a Sharper Image", Sep. 1997, Communication Engineering & Dessign <http://www.cedmagazine.com/ced/9709/9709d.htm>, 7 pages.

David Searchrist, "Videoconferencing software is the next best thing to being here," http://www.byte.com/art/9709/sec10/art1.htm, Sep. 1997, 9 pgs.

* cited by examiner

DIGITAL TELEVISION WITH SUBSCRIBER CONFERENCE OVERLAY

CROSS-REFERENCE TO RELATED APPLICATION

This application is a continuation of the U.S. patent application Ser. No. 10/444,261 filed originally on May 22, 2003 now U.S. Pat. No. 7,221,387, which is a continuation of the U.S. patent application Ser. No. 10/026,095 filed on Dec. 21, 2001, now issued as U.S. Pat. No. 6,590,602, which is a divisional of the U.S. patent application Ser. No. 09/095,390 filed originally on Jun. 10, 1998, now issued as U.S. Pat. No. 6,339,842.

FIELD OF INVENTION

The invention relates to digital television systems, particularly to subscriber video conferencing with conventional programming.

BACKGROUND OF INVENTION

Digital television (DTV) attributes have been standardized by industry (e.g., Advanced Television Systems Committee (ATSC) and government (U.S. Federal Communications Commission (FCC)). Such DTV standards, which provide enhanced multimedia quality, as well as interactive data services, are hereby incorporated by reference. Generally, however, DTV specifications contemplate program delivery to various receiver units, but not necessarily communication between receiver units. Accordingly, there may be need for conferencing between units receiving digital system programming.

SUMMARY OF INVENTION

The invention resides in digital television system configured for subscriber conference overlay during program delivery. Billing and advertisement may be personalized according to actual program viewing and/or conferencing activity by DTV receiver. Receiver unit includes media input/output device for multi-user conferencing. Subscribers may be added or removed during programming.

DETAILED DESCRIPTION

Figure 1:
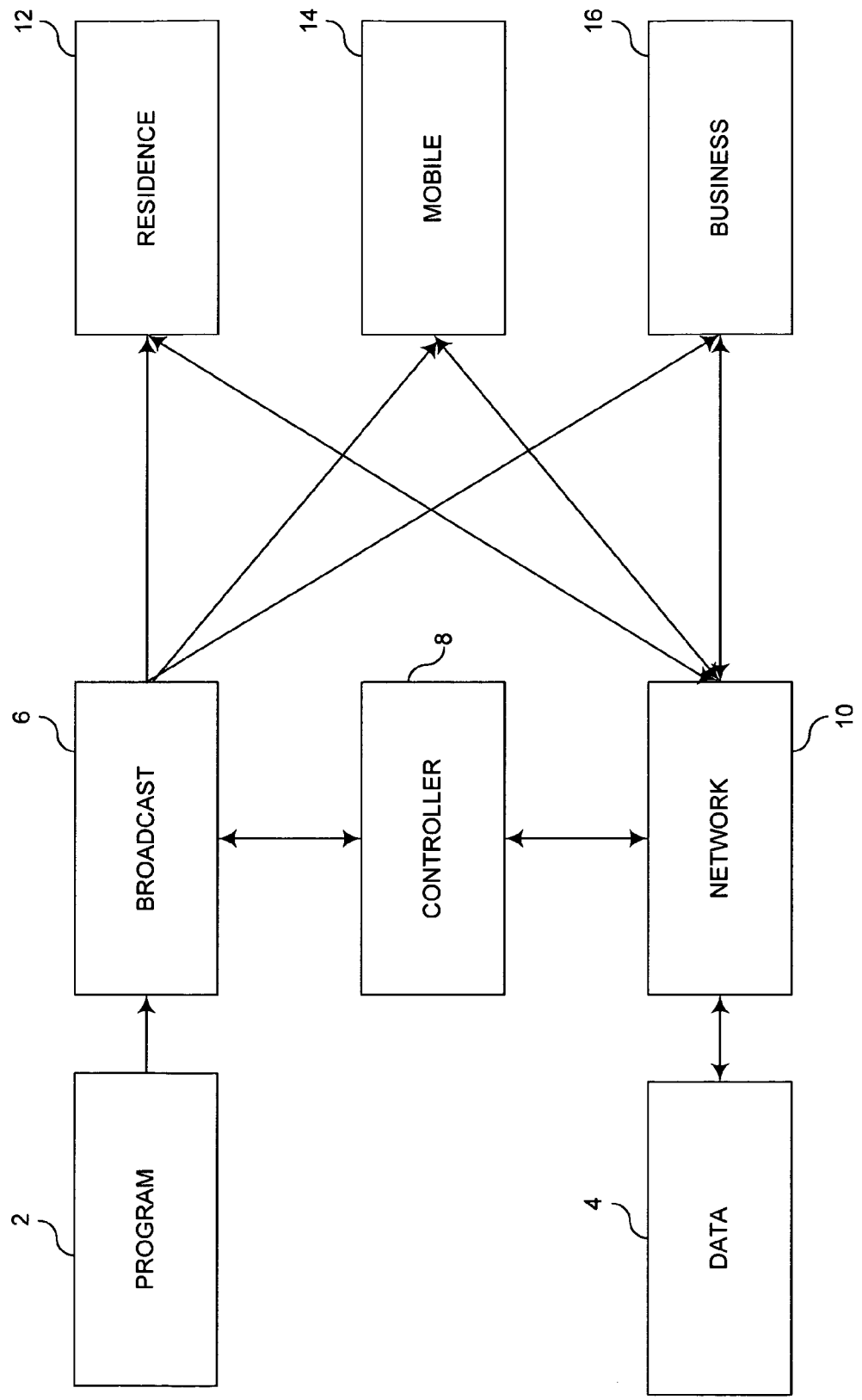
FIG. 1 is block diagram of integrated digital television program and data delivery system for enabling present invention.

FIG. 1 is block diagram of integrated digital television program and data delivery system, including one or more residential 12, mobile 14 and business 16 subscriber, receiver and/or digital television (DTV) units coupled over broadcast 6 and/or network 10 channels respectively to program 2 and/or data 4 sources. Controller 8, which is one or more processor, server, computer or other functionally equivalent controller functionality coupled to broadcast 6 and/or network 10 channel, may affect network 10 and broadcast 6 functionality as described herein.

Program source 2 comprises one or more source for broadcasting one or more video and/or data programs, or other functionally equivalent information signal stream, according to conventional digital and/or analog program broadcasting, accessible or addressable publicly or privately over various broadcast 6 equipment, medium, or other functionally equivalent channels, such as cable, optical fiber, microwave, wireless radio frequency (RF) transmission, direct broadcast satellite (DBS), multichannel multipoint distribution system (MMDS), local multipoint distribution service (LMDS), etc. For example, program 2 may comprise live sports or entertainment performance event, such as professional football game, broadcast over restricted pay-per-view television channels.

Data source 4 comprises one or more source for providing two-way or interactive access to one or more database, file, directory, or other functionally equivalent data repository site or signal source, accessible or addressable publicly or privately over conventional network 10, such as local or wide area network, world-wide web Internet/intranet, or combination thereof, including, for example, network switch, router, bridge, gateway, hub, or other wired and/or wireless networking connection equipment for enabling ISDN, SONET, ATM, frame relay, gigabit Ethernet, TCP/IP, virtual private networks, xDSL, or other similar functionality. Additionally, data 4 may comprise text, graphics, video, or other digital or media information, such as current news update, photographic images, video or audio clips, sports statistics or analysis, stock quotes or financial data, weather forecast report, research data, commercial transaction details, product pricing, etc.

In accordance with important aspect of present invention, digital television system includes multiple receivers coupled selectively or programmably to program 2 and/or data 4 source over broadcast 6 and/or network 10 communications infrastructure, wherein conferencing or communication among DTV subscribers 18 occurs during program and/or data delivery. Consequently, controller 8 may send or transmit service bill indication to participating DTV units per actual program view or conference usage. As used herein, term "conference" or "conferencing" is interpreted broadly and understood to mean any communication between multiple parties.

Additionally, controller may facilitate electronic narrowcast delivery of personalized or customized commercial and/or non-commercial message to select DTV units. Controller 8 and/or subscribers 18 may employ one or more intelligent agents or functionally equivalent software constructs to search, obtain, or transact certain information or activity across network 10. Controller 8 or subscriber unit 18 processor may selectively restrict or censor pre-defined program or data classes or titles, for example, to content screening criteria and/or procedure provided for so-called V-chip specifications. Preferably, each DTV receiver includes searchable and/or identifiable address and various multimedia input/output device capability for enabling video conferencing. Moreover, DTV units may be added or removed during conference period.

Figure 2:
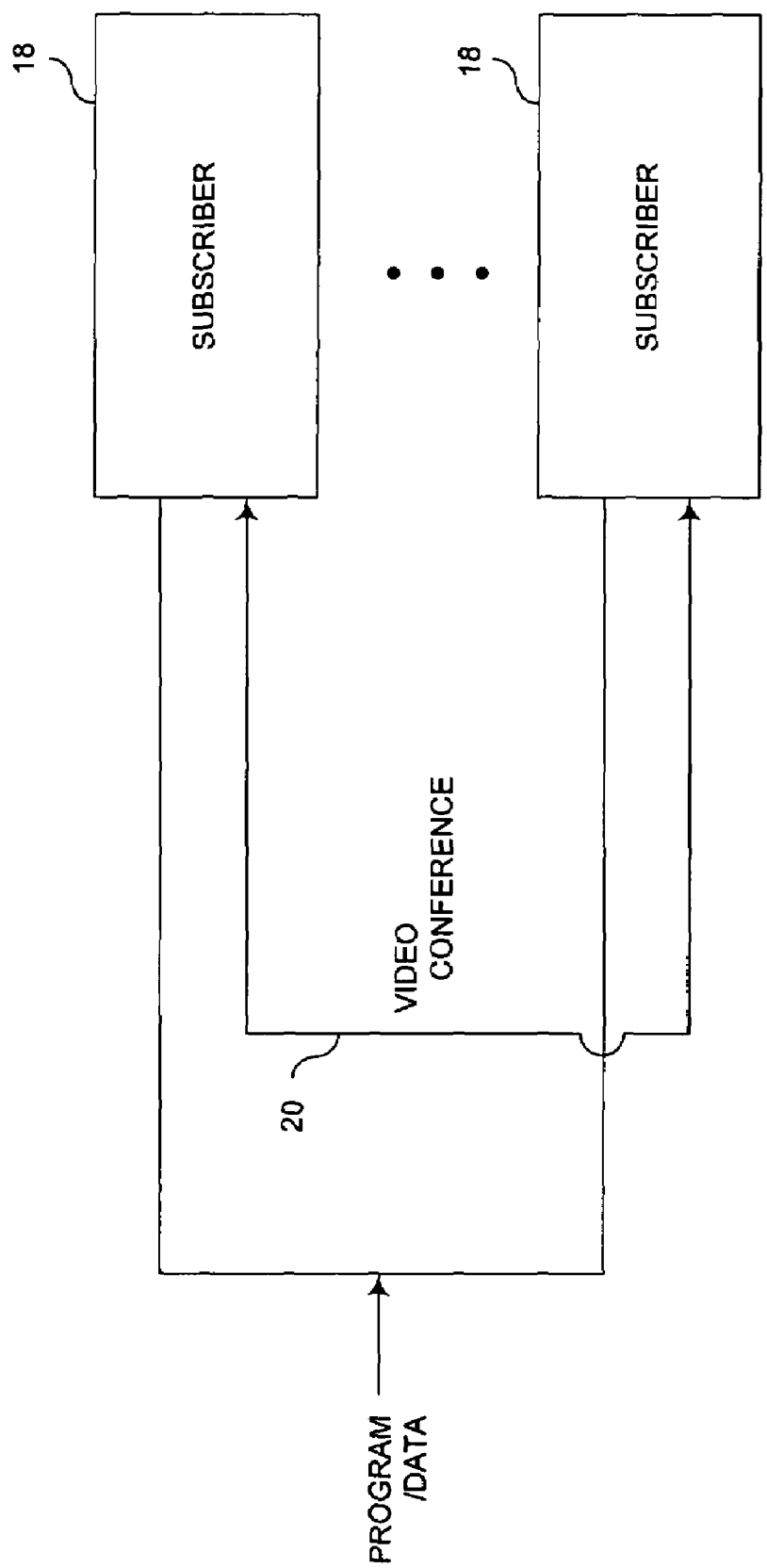
FIG. 2 is simplified diagram of novel overlay of subscriber conferencing over program and/or data delivery.

Accordingly, FIG. 2 shows overlay of subscriber conferencing 20 over program and/or data delivery to subscribers 18. In this networked configuration, controller 8 effectively serves as broadband system headend processor for generating, forwarding, modifying, storing, accessing or otherwise controlling program/data delivery to subscribers 18, while generating, forwarding, modifying, storing, accessing or otherwise controlling video conferencing signal transmission between subscribers 18.

Preferably, such program/data signal generated, transmitted or otherwise processed to receiver units comply with established DTV standards, such as ATSC or other generally accepted industry DTV information or signal format and/or protocol interface, and video conferencing signal generated, transmitted or otherwise processed between receiver units comply with established video conferencing standards, such as H.323, H.324, H.320, T.120 or other generally accepted industry video/data conferencing information or signal format and/or protocol interface, such currently published or online-accessible standards being hereby incorporated by reference.

Figure 3:
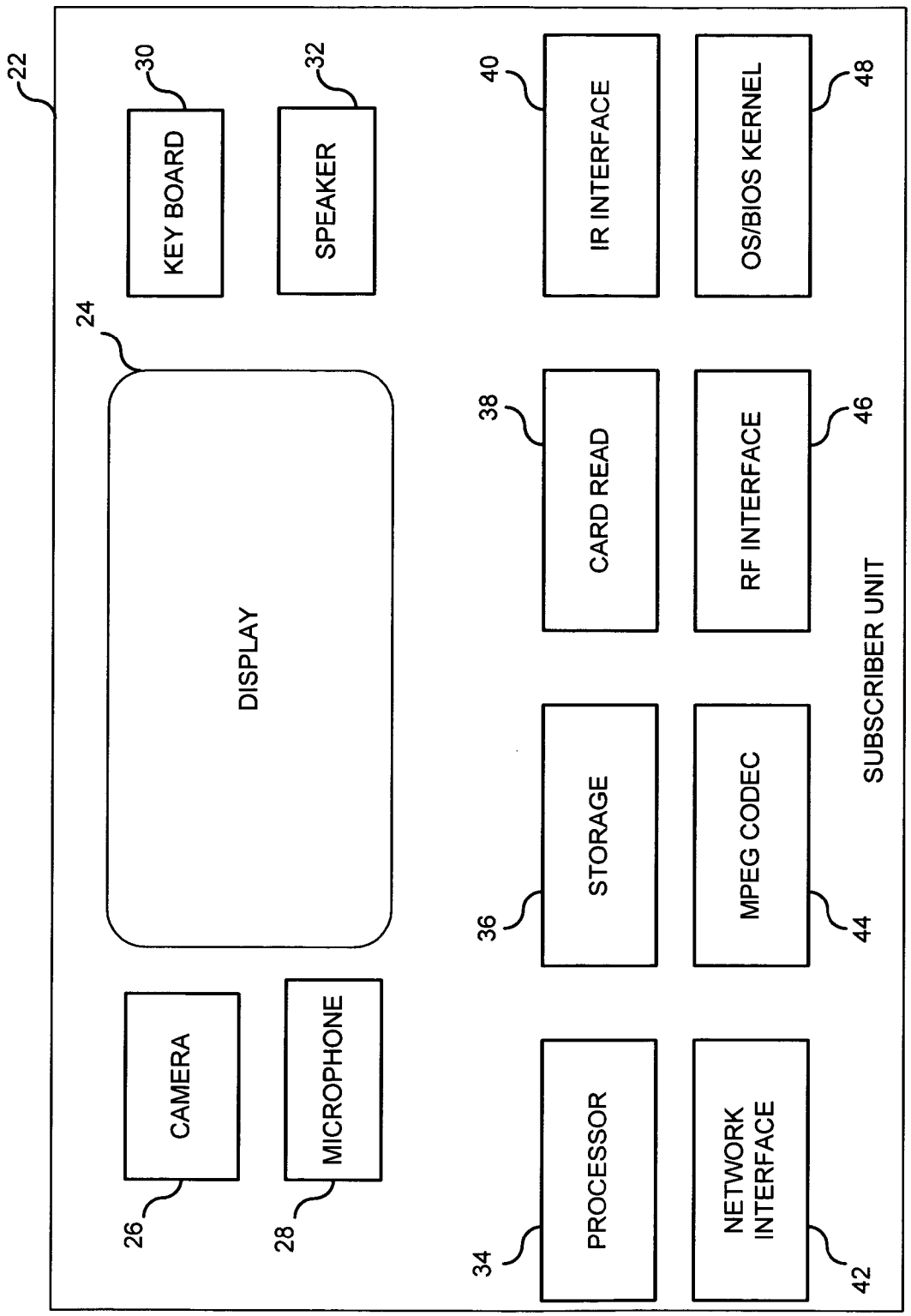
FIG. 3 is representative digital TV subscriber unit used according to present invention.

FIG. 3 shows digital television subscriber unit 22, which may be implemented as one or more DTV receivers 12, 14, or 16 of FIG. 1. Preferably, DTV unit 22, which functions in compliance with Advanced Television Systems Committee (ATSC) standard for DTV equipment and system operation, substantially includes display panel or screen with video frame buffer 24, digital video-conferencing camera or image sensor 26, microphone 28, keyboard and/or mouse 30, speaker(s) 32, processor or controller 34, digital memory or recordable video disk storage 36, peripheral card reader 38, remote control infrared interface 40, network interface or modem 42 (e.g., for coupling to network channel 10), digital compressed video encoder/decoder (i.e., according to Moving Pictures Experts Group (MPEG) industry standards)), radio frequency (RF), broadband or wireless communications interface 46 (e.g., for coupling to broadcast channel 6), and operating system, BIOS, browser, or other associated kernel software 48 for generally enabling system and controller 34 operation and network communications.

It is contemplated that ATSC-compliant DTV unit 22 may be embodied as well in personal or network computer, workstation, set-top television device, or functionally equivalent processing and associated network equipment, as configured to operate as specified herein according to present invention.

Moreover, controllers 8, 34 execute one or more computer programs for performing functions as described herein, preferably according to embedded or real-time software syntax, such as JAVA and/or Windows CE, which currently published or on-line specifications are hereby incorporated by reference.

Figure 4:
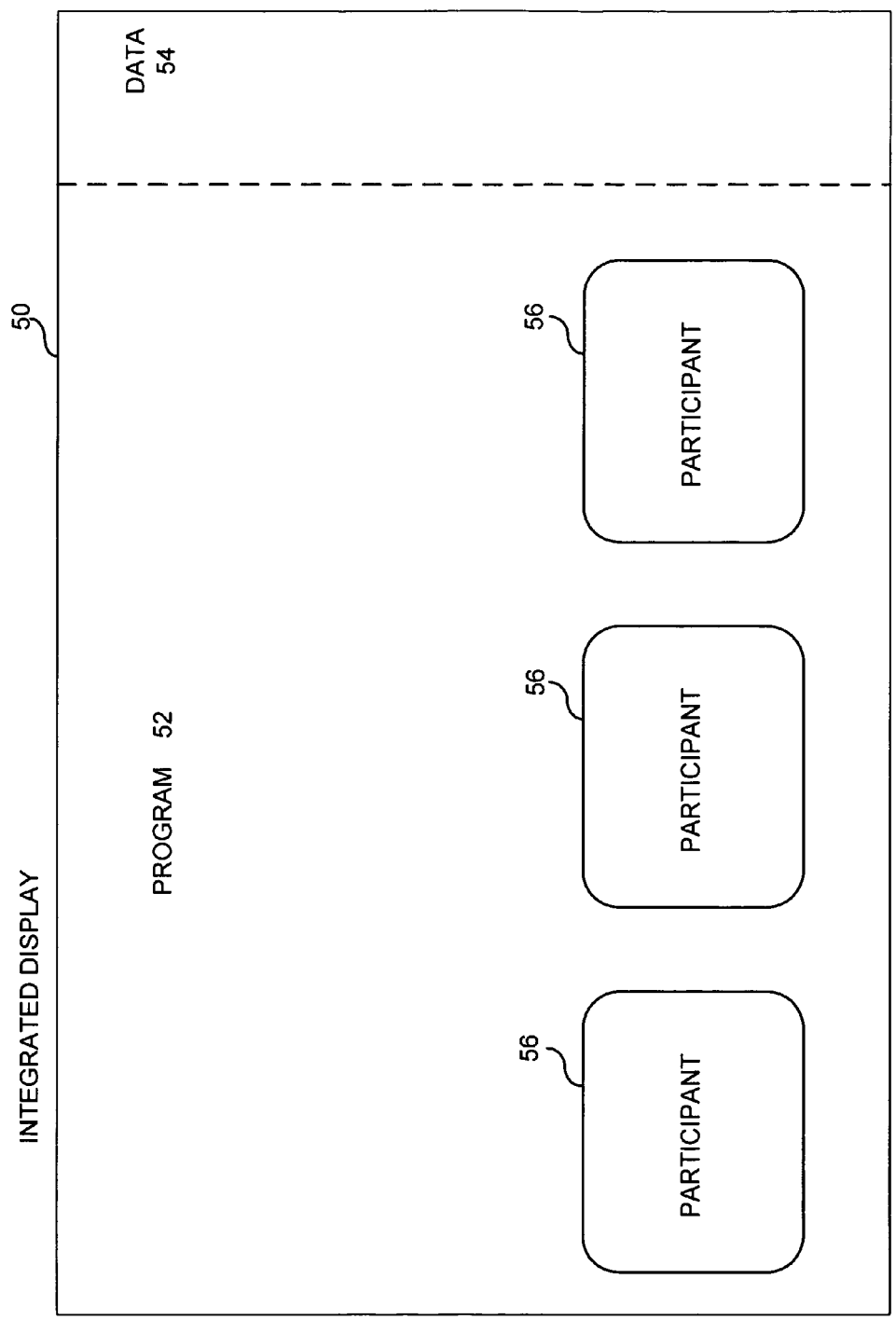
FIG. 4 is sample digital TV display according to present invention.

When DTV unit 22 operates according to present invention, sample display 24 screen output may be as represented in FIG. 4. In particular, display 24 may integrate, combine, mix, or otherwise include program 52 and/or data 54, effectively through video frame buffer, with video conferencing windows from current (i.e., self) and/or other DTV participants 56 coupled thereto, preferably during program/data delivery. For example, each screen element 52, 54, 56 may be shown as picture within or adjacent to another picture element. In this overlaid manner, each DTV unit in select set displays common program and/or data stream, as well as conference video and audio signal output as generated from video camera and microphone from other participant DTV units.

Preferably, such program and/or video signals are compressed and encoded according to industry standard such as MPEG format. Display 50 may also show whiteboard-type screen commonly among participants 56 for jointly communicating text, graphics, or other observable or audible program or data, such as for workgroup or class collaboration to review or discuss draft documents, faxes, or other forms or files.

Figure 5:
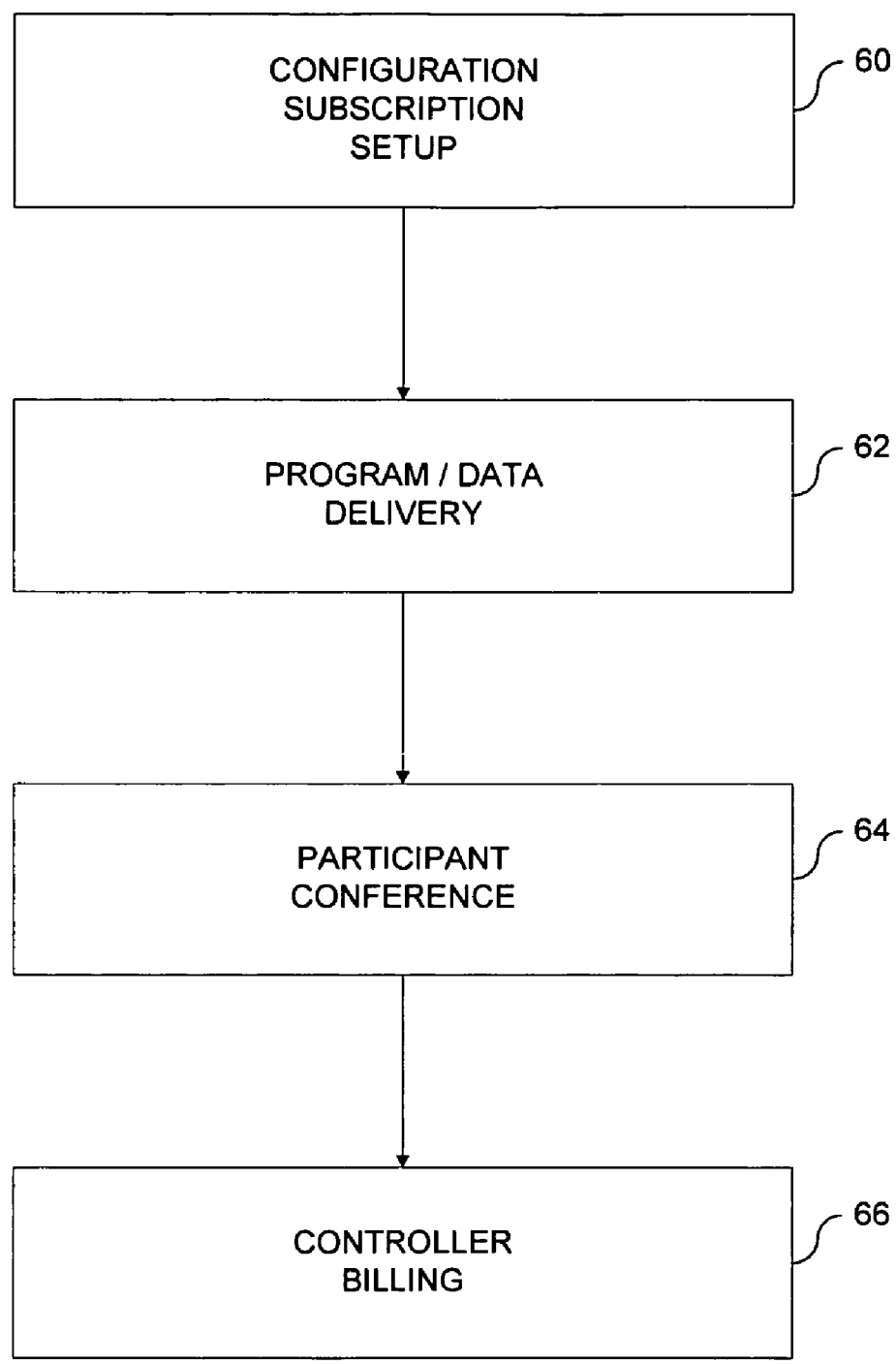
FIG. 5 is flow chart of operational steps of present invention.

FIG. 5 shows operational flow chart, including steps for system configuration and subscription set-up 60, program and/or data delivery 62, participant conference 64, and controller billing 66. Preferably, controller 8, serves as central processor to coordinate DTV unit set-up, user smartcard account authorization or identity authentication program/data and/or conference scheduling, programming, viewing, output formatting, conference access and communication, billing, advertising, and other associated activity, particularly for managing access to program 2, data 4, as well as DTV video conferencing signals 20. To reduce latency, controller 8 may transmit static image instead of live video.

For example, controller 8 may authorize or cause certain DTV units to be added or removed dynamically from one or more video conferencing active set or selected logical group, as well as restrict select DTV unit(s) from viewing certain program and/or data. Moreover, controller 8 monitors one or more actual program/data viewing and/or conferencing usage for appropriate billing. Furthermore, controller 8 may direct personalized or targeted commercial, incentive, or advertising messages to certain recognized demographic interest group, DTV subscribers or participant video conferencing parties.

Preferably, controller 8 directs such messages dynamically or adaptively according to current subscriber or participant information activity or needs, as well as product availability, market pricing, or other commercial attribute. Additionally, controller 8 may take corrective action or functional adjustment to redirect, restrict, control, or otherwise manage network, program/data, or other system resources, upon detecting actual or possible performance bottlenecks or other equipment or connection fault causing undesirable impact on such information delivery.

In one embodiment of present invention, DTV system is configured for luxury-suite type or other effectively exclusive membership multi-user conferenced viewing of live sports event, such that professional football, basketball, baseball, hockey, soccer, or other competitive individual, team, or tournament telecast is provided as program 2 through broadcast channel 6, including preferably statistical or background data 4 about player, team, or other related game aspect. In particular, controller 8 provides proper access by authorized DTV subscribers 18 to such sports program and/or data. Additionally, controller 8 coordinates or monitors video conferencing activity occurring directly or indirectly between DTV units watching common program/data stream.

Hence, for example, initially, during configuration subscription setup phase 60, system or headend controller 8 begins to identify system configuration, network address, program order and account status of any subscriber units coupled thereto over broadcast 6 and/or network 10 channels. Commercial transaction may occur to define DTV receiver unit user subscriptions, particularly for authenticating, billing, scheduling, notifying, requesting or otherwise providing desired access to any upcoming or current program 2 or database 4. As appropriate, controller 8 may conduct remote diagnostics over such channels to various units 12, 14, 16 to ensure proper functioning for signal delivery.

Next, program and/or data delivery may commence according to controller 8 programmable selection to enable digital transmission for electronic signal delivery 62 of certain program 2 and/or data 4 for presentation in integrated display 50 of selected or addressed DTV subscriber units 18. Then, thereafter, prior, or simultaneously, select participants 56 are enabled for video conferencing 20, particularly by allowing such participants to be monitored by activated video camera 26 and/or microphone 28, for transmission of monitored static image or live motion video compressed encoded digital signal for presentation in display screen 50. Upon completion of program/data delivery and conferencing activity, controller 8 may send proper billing indications to participant DTV units. Controller 8 may appropriately add or delete subscriber 18 in active database.

Therefore, in this combined DTV program/data viewing and select viewer conferencing scheme, important objective of emulating luxury-suite or otherwise more collaborative, intimate or personal conditions among associated audience members located at different locations is achieved effectively.

Optionally, while receiving program/data, conferenced subscriber may also send or receive electronic text message to other subscribers or other mail account addressable through network 10, or run various application programs locally or in distributed client-server networked manner, preferably in common with other conferenced DTV units, such as for multi-user simulation or gaming application.

To improve system program/data broadcast or video conferencing performance, for example, when restricted effectively by channel bandwidth or traffic congestion, controllers 8, 34 may reduce or eliminate actual transmission of full content video signal, and preferably transmit information subset, such as static image, text and/or voice.

Foregoing described embodiments of invention are provided as illustration and description. It is not intended to limit invention to precise form described. Other variations and embodiments are possible in light of above teaching, and it is thus intended that scope of invention not be limited by detailed description, but rather by claims as follow.

We claim:

1. Integrated television conferencing apparatus with centrally-integrated personalized screening of DTV content overlaid with conferencing comprising:

means for video-conferencing a television user comprising a DTV unit with a network processor before, while or after a program broadcast or data application is accessed from memory or via a network data interface or broadcast program channel, whereby such conference and access are integrated centrally and overlaid functionally for management or coordination by a user transaction controller, the controller or processor restricting or permitting such overlaid user access to the program broadcast or data application from memory or via the network by censoring or authorizing one or more program broadcast or data application selectively according to privately pre-defined content-screening criteria using one or more program or data classes or titles, such controller or processor further enabled to restrict or permit the conference by dynamically adding or removing the DTV unit to or from one or more video conferencing active set or selected logical group, whereby television and conferencing services are centrally integrated for personalized screening such that effectively the same controller or processor that functionally overlays management or coordination of user access to the program broadcast or data application according to privately pre-defined content-screening criteria using one or more program or data classes or titles for censoring or authorizing such access, also manages or coordinates user conferencing according to privately pre-defined active set or selected logical group for restricting or permitting such conferencing, such centralized integration of screening criteria being pre-defined privately by a pre-defining user for both television and conferencing thereby enabling privately accessed personal television and conferencing services.

2. Apparatus of claim 1 wherein:
   the program broadcast or data application comprises a professional football game, statistics or analysis, whereby a virtual game or simulation program is run locally by the user in common with the network processor.

3. Apparatus of claim 1 wherein:
   the controller identifies a user media capability or address, program or data content, or actual or possible channel bandwidth congestion or network connection fault, thereby enabling restricted, redirected, or reduced transmission effectively to improve such conference or access.

4. Apparatus of claim 1 wherein:
   the controller or user uses an intelligent software agent to run a network search, thereby enabling selection of the program broadcast or data application for scheduled viewing, storage or delivery to the user or network processor.

5. Apparatus of claim 1 wherein:
   the controller directs a personalized or targeted commercial or advertisement to the user or network processor for customized screen display or incentive messaging dynamically or adaptively according to user or network processor action or commercial attribute, thereby enabling the controller to integrate, combine or mix graphically such commercial or advertisement with or within the program broadcast or data application.

6. Apparatus of claim 1 wherein:
   the controller authorizes or authenticates such conference or access via user or network processor smart-card, thereby enabling set-top television device authorization or authentication for internet, cable, satellite, optical fiber, microwave, MMDS, LMDS, wireless or other delivery source of the program broadcast or data application.

7. Integrated television conference transaction method with centrally-integrated personalized screening of DTV content overlaid with conferencing comprising the step of:
   transacting by a television user comprising a DTV unit video-conferencing with a network processor before, while or after a program broadcast or data application is accessed from memory or via a network data interface or broadcast program channel, whereby such conference and access are integrated centrally and overlaid functionally for management or coordination by a user transaction controller, the controller or processor restricting or permitting such overlaid user access to the program broadcast or data application from memory or via the network by censoring or authorizing one or more program broadcast or data application selectively according to privately pre-defined content-screening criteria using one or more program or data classes or titles, such controller or processor further enabled to restrict or permit the conference by dynamically adding or removing the DTV unit to or from one or more video conferencing active set or selected logical group, whereby television and conferencing services are centrally integrated for personalized screening such that effectively the same controller or processor that functionally overlays management or coordination of user access to the program broadcast or data application according to privately pre-defined content-screening criteria using one or more program or data classes or titles for censoring or authorizing such access, also manages or coordinates user conferencing according to privately pre-defined active set or selected logical group for restricting or permitting such conferencing, such centralized integration of screening criteria being pre-defined privately by a pre-defining user for both television and conferencing thereby enabling privately accessed personal television and conferencing services.

8. Method of claim 7 wherein:
the program broadcast or data application comprises a professional football game, statistics or analysis, whereby a virtual game or simulation program is run locally by the user in common with the network processor.

9. Method of claim 7 wherein:
the controller identifies a user media capability or address, program or data content, or actual or possible channel bandwidth congestion or network connection fault, thereby enabling restricted, redirected, or reduced transmission effectively to improve such conference or access.

10. Method of claim 7 wherein:
the controller or user uses an intelligent software agent to run a network search, thereby enabling selection of the program broadcast or data application for scheduled viewing, storage or delivery to the user or network processor.

11. Method of claim 7 wherein:
the controller directs a personalized or targeted commercial or advertisement to the user or network processor for customized screen display or incentive messaging dynamically or adaptively according to user or network processor action or commercial attribute, thereby enabling the controller to integrate, combine or mix graphically such commercial or advertisement with or within the program broadcast or data application.

12. Method of claim 7 wherein:
the controller authorizes or authenticates such conference or access via user or network processor smart-card, thereby enabling set-top television device authorization or authentication for internet, cable, satellite, optical fiber, microwave, MMDS, LMDS, wireless or other delivery source of the program broadcast or data application.

13. Integrated television conferencing software with centrally-integrated personalized screening of DTV content overlaid with conferencing comprising:
reconfigurable program or firmware for enabling a video-conference between a television user comprising a DTV unit and a network processor before, while or after a program broadcast or data application is accessed from memory or via a network data interface or broadcast program channel, whereby such conference and access are integrated centrally and overlaid functionally for management or coordination by a user transaction controller, the controller or processor restricting or permitting such overlaid user access to the program broadcast or data application from memory or via the network by censoring or authorizing one or more program broadcast or data application selectively according to privately pre-defined content-screening criteria using one or more program or data classes or titles, such controller or processor further enabled to restrict or permit the conference by dynamically adding or removing the DTV unit to or from one or more video conferencing active set or selected logical group, whereby television and conferencing services are centrally integrated for personalized screening such that effectively the same controller or processor that functionally overlays management or coordination of user access to the program broadcast or data application according to privately pre-defined content-screening criteria using one or more program or data classes or titles for censoring or authorizing such access, also manages or coordinates user conferencing according to privately pre-defined active set or selected logical group for restricting or permitting such conferencing, such centralized integration of screening criteria being pre-definable privately by one or more pre-defining user for television or conferencing thereby enabling privately accessed personal television and conferencing services.

14. Software of claim 13 wherein:
the program broadcast or data application comprises a professional football game, statistics or analysis, whereby a virtual game or simulation program is run locally by the user in common with the network processor.

15. Software of claim 13 wherein:
the controller identifies a user media capability or address, program or data content, or actual or possible channel bandwidth congestion or network connection fault, thereby enabling restricted, redirected, or reduced transmission effectively to improve such conference or access.

16. Software of claim 13 wherein:
the controller or user uses an intelligent software agent to run a network search, thereby enabling selection of the program broadcast or data application for scheduled viewing, storage or delivery to the user or network processor.

17. Software of claim 13 wherein:
the controller directs a personalized or targeted commercial or advertisement to the user or network processor for customized screen display or incentive messaging dynamically or adaptively according to user or network processor action or commercial attribute, thereby enabling the controller to integrate, combine or mix graphically such commercial or advertisement with or within the program broadcast or data application.

18. Software of claim 13 wherein:
the controller authorizes or authenticates such conference or access via user or network processor smart-card, thereby enabling set-top television device authorization or authentication for internet, cable, satellite, optical fiber, microwave, MMDS, LMDS, wireless or other delivery source of the program broadcast or data application.

19. ATSC-compliant digital video signal processor with centrally-integrated personalized screening of DTV content overlaid with conferencing comprising:
a processor for video-conferencing a video user comprising an ATSC-compliant DTV unit with a network source before, while or after a program broadcast or video application is accessed from memory or via a network data interface or broadcast program channel, whereby such conference and access are integrated and overlaid functionally for management or coordination, the network source or processor restricting or permitting such overlaid user access to the program broadcast or video application from memory or via the network by censoring or authorizing one or more program broadcast or video application selectively according to privately pre-defined content-screening criteria using one or more program or video classes or titles, whereby DTV content and conferencing are centrally integrated for personalized screening such that effectively the same processor or network source that functionally overlays management or coordination of user access to the program broadcast or video application according to privately pre-defined content-screening criteria using one or more program or video classes or titles for censoring or authorizing such access, also manages or coordinates conferencing according to privately pre-defined active set or selected logical group for restricting or permitting such conferencing, such centralized integration of screening criteria for both DTV content and conferencing thereby enabling privately accessed personal DTV content and conferencing services; and a digital video codec for processing an accessed or conferenced signal, such controller or processor further enabled to restrict or permit the conference by dynamically adding or removing the DTV unit to or from one or more video conferencing active set or selected logical group.

20. Digital video signal processor of claim 19 wherein:
the program broadcast or video application comprises a sport or game, whereby a virtual game or simulation program is run during the sport or game access.

21. Digital video signal processor of claim 19 wherein:
the processor identifies a user media capability or address, program or data content, or actual or possible channel bandwidth congestion or network connection fault, thereby enabling restricted, redirected, or reduced transmission of the conference or access.

22. Digital video signal processor of claim 19 wherein:
a software agent runs a network search of one or more program broadcast or video application.

23. Digital video signal processor of claim 19 wherein:
a personalized or targeted commercial or advertisement is accessed for customized screen display or incentive messaging dynamically or adaptively, thereby enabling the processor to integrate, combine or mix graphically such commercial or advertisement with or within the program broadcast or video application.

24. Digital video signal processor of claim 19 wherein:
the conference or access is authorized or authenticated via a set-top television device coupled to internet, cable, satellite, optical fiber, microwave, MMDS, LMDS, wireless or other delivery source of the program broadcast or video application.

25. ATSC-compliant digital video signal processing method with centrally-integrated personalized screening of DTV content overlaid with conferencing comprising the steps of:
video-conferencing a video user comprising an ATSC-compliant DTV unit with a network source before, while or after a program broadcast or video application is accessed and overlaid functionally from memory or via a network data interface or broadcast program channel, the network source or DTV unit restricting or permitting such overlaid user access to the program broadcast or video application from memory or via the network by censoring or authorizing one or more program broadcast or video application selectively according to privately pre-defined content-screening criteria using one or more program or video classes or titles, such network source further enabled to restrict or permit the conference by dynamically adding or removing the DTV unit to or from one or more video conferencing active set or selected logical group, whereby DTV content and conferencing are centrally integrated for personalized screening such that effectively the same network source or DTV unit that functionally overlays management or coordination of user access to the program broadcast or video application according to privately pre-defined content-screening criteria using one or more program or video classes or titles for censoring or authorizing such access, also manages or coordinates user conferencing according to privately pre-defined active set or selected logical group for restricting or permitting such conferencing, such centralized integration of screening criteria for both DTV content and conferencing thereby enabling privately accessed personal DTV content and conferencing services; and processing an accessed or conferenced signal using a digital video codec.

26. Method of claim 25 wherein:
the program broadcast or video application comprises a sport or game, whereby a virtual game or simulation program is run during the sport or game access.

27. Method of claim 25 wherein:
a user media capability or address, program or data content, or actual or possible channel bandwidth congestion or network connection fault is identified for enabling restricted, redirected, or reduced transmission of the conference or access.

28. Method of claim 25 further comprising step of:
running a network search of one or more program broadcast or video application.

29. Method of claim 25 wherein:
a personalized or targeted commercial or advertisement is accessed for customized screen display or incentive messaging dynamically or adaptively, such commercial or advertisement being integrated, combined or mixed graphically with or within the program broadcast or video application.

30. Method of claim 25 wherein:
the conference or access is authorized or authenticated via a set-top television device coupled to internet, cable, satellite, optical fiber, microwave, MMDS, LMDS, wireless or other delivery source of the program broadcast or video application.

31. Functionally-overlaid advertising for ATSC-compliant DTV conferencing subscribers with centrally-integrated personalized screening of DTV content overlaid with conferencing comprising steps:
monitoring at least one ATSC-compliant DTV virtual audience subscribing to a logical group, such group comprising a plurality of conferencing virtual audiences; and
advertising to at least one functionally-overlaid conferencing virtual audience;
wherein such overlaid virtual audience access to the advertising is restricted or permitted by censoring or authorizing selectively according to privately pre-defined content-screening criteria using one or more advertising class or title, such virtual audience conference being restricted or permitted by dynamically adding or removing such virtual audience to or from one or more video conferencing active set or selected logical group, whereby advertising and conferencing services are centrally integrated for personalized screening such that effectively same controller or processor that functionally overlays management or coordination of virtual audience access to the advertising according to privately pre-defined content-screening criteria using one or more advertising classes or titles for censoring or authorizing such access, also manages or coordinates conferencing according to privately pre-defined active set or selected logical group for restricting or permitting such conferencing, such centralized integration of screening criteria being pre-definable privately by one or more pre-defining virtual audience for advertising or conferencing thereby enabling privately accessed personal advertising and conferencing services.

32. Advertising of claim 31 wherein:
at least one of the conferencing virtual audience comprises a digital television, wherein the advertisement comprises a personalized game for execution by the digital television.

33. Advertising of claim 32 wherein:
the digital television runs an intelligent agent to search for one or more game application.

34. Advertising of claim 31 wherein:
the advertisement comprises a message targeted to one or more audience demographic interest or viewing activity.

35. DTV subscriber unit for real-time functionally-overlaid collaborative network gaming with centrally-integrated personalized screening of DTV content overlaid with conferencing comprising:
a processor; and an interface;
wherein the processor runs a game application locally or across a network via the interface in common with a DTV subscriber unit effectively running the game application, whereby the other subscriber is coupled via the interface to enable video conferencing or messaging between coupled subscriber units effectively playing the game application during such conferencing or messaging, the interface being coupled to a broadband system headend controller for centrally controlling access in common or selectively by one or more subscriber units to the conferencing or messaging and the game application, wherein the controller functionally overlays the game application that is accessed by a plurality of subscriber units, with the conference or messaging, the controller or processor restricting or permitting one or more overlaid subscriber unit access to the game application locally or across the network by censoring or authorizing one or more game application selectively according to privately pre-defined content-screening criteria using one or more program or data class or title, such controller or processor further enabled to restrict or permit the conference or message by dynamically adding or removing the DTV unit to or from one or more video conferencing or messaging active set or selected logical group, whereby gaming and conferencing or messaging services are centrally integrated for personalized screening such that effectively the same controller or processor that functionally overlays management or coordination of subscriber access to the gaming application according to privately pre-defined content-screening criteria using one or more program or data classes or titles for censoring or authorizing such access, also manages or coordinates conferencing or messaging according to privately pre-defined active set or selected logical group for restricting or permitting such conferencing or messaging, such centralized integration of screening criteria being pre-definable privately by a pre-defining subscriber for both gaming and conferencing or messaging thereby enabling privately accessed personal gaming and conferencing or messaging services.

36. Subscriber unit of claim 35 wherein:
the processor runs a software program or an intelligent agent for searching or transacting via the network, thereby enabling network delivery of or access to one or more multi-user game application.

37. Subscriber unit of claim 35 further comprising:
a user interface for displaying at least one screen element representing a subscriber playing the game application while conferencing or messaging.

38. DTV communication controller for providing functionally-overlaid real-time gaming and conferencing between multiple subscriber units with centrally-integrated personalized screening of DTV content overlaid with conferencing comprising:
means for coupling to a first subscriber unit playing a multi-user game application; and
means for coupling to a DTV subscriber unit playing effectively the same multi-user game application;
whereby a video conference or message is enabled and functionally overlaid between both subscriber units while, after or before playing effectively the same multi-user game application, such that the communication controller functions effectively as a system headend controller in an integrated broadband services network for multi-user gaming and conferencing or messaging, thereby enabling centralized network control of subscriber access selectively by one or more subscriber units to both conferencing or messaging and multi-user game application services, the controller restricting or permitting one or more overlaid subscriber unit access to the game application by censoring or authorizing one or more game application selectively according to privately pre-defined content-screening criteria using one or more program or data class or title, such controller further enabled to restrict or permit the conference or message by dynamically adding or removing the DTV unit to or from one or more video conferencing or messaging active set or selected logical group, whereby gaming and conferencing or messaging services are centrally integrated for personalized screening such that effectively the same controller that functionally overlays management or coordination of subscriber access to the game application according to privately pre-defined content-screening criteria using one or more program or data classes or titles for censoring or authorizing such access, also manages or coordinates conferencing or messaging according to privately pre-defined active set or selected logical group for restricting or permitting such conferencing or messaging, such centralized integration of screening criteria being pre-definable privately by a pre-defining subscriber for both gaming and conferencing or messaging thereby enabling privately accessed personal gaming and conferencing or messaging services.

39. Communication controller of claim 38 further comprising:
means for controlling or restricting access to the conference or message by an additional subscriber unit playing effectively the same multi-user game application.

40. The communication controller of claim 38 further comprising:

means for sending a message to the first or second subscriber unit adaptively or dynamically in response to such subscriber unit gaming, conferencing or messaging action, thereby enabling network transaction or billing according to gaming or conferencing usage by such subscriber unit.

41. Communication method between DTV subscriber units for functionally-overlaid real-time collaborative gaming with centrally-integrated personalized screening of DTV content overlaid with conferencing comprising the steps of:

running a multi-user game application effectively in common by a plurality of DTV subscriber units locally or across a network; and functionally-overlaid conferencing or messaging between the subscriber units via the network while running the multi-user game application;

wherein a system headend controller for multi-user gaming and conferencing or messaging controls access by one or more subscriber units to conferencing or messaging while, before or after such one or more subscriber units runs the multi-user game application, the controller restricting or permitting one or more overlaid subscriber unit access to the game application locally or across the network by censoring or authorizing one or more game application selectively according to privately pre-defined content-screening criteria using one or more program or data classes or titles, such controller further enabled to restrict or permit the conference or message by dynamically adding or removing the DTV unit to or from one or more video conferencing or messaging active set or selected logical group, whereby gaming and conferencing or messaging services are centrally integrated for personalized screening such that effectively the same controller that functionally overlays management or coordination of subscriber access to the game application according to privately pre-defined content-screening criteria using one or more program or data classes or titles for censoring or authorizing such access, also manages or coordinates conferencing or messaging according to privately pre-defined active set or selected logical group for restricting or permitting such conferencing or messaging, such centralized integration of screening criteria being pre-definable privately by one or more pre-defining subscriber for both gaming and conferencing or messaging thereby enabling privately accessed personal gaming and conferencing or messaging services.

42. Communication method of claim 41 wherein:
the multi-user game application comprises a simulated sports game, whereby a screen element representing at least one subscriber unit playing the multi-user game application is displayed during the conference or message.

43. Communication method of claim 41 wherein:
one or more subscriber unit receives a personalized message or bill for actual usage of or participation in such game application, conference or messaging.

44. Communication method of claim 41 wherein:
the conference and broadcast enabled to be accessed by a non-mobile subscriber unit comprising a residential or business set-top device, digital television, or personal computer.

45. Multi-user game application for DTV users with centrally-integrated personalized screening of DTV content overlaid with conferencing comprising:
a simulator or gaming program for access by a plurality of DTV users via a network; and
means for functionally-overlaid conferencing between the users, thereby enabling a virtual community among on-line players;
wherein a broadband headend system processor for integrated multi-user gaming and conferencing controls access by one or more users to conferencing while, before or after one or more user accesses the simulator or gaming program, the processor restricting or permitting one or more overlaid user access to the program by censoring or authorizing one or more program selectively according to privately pre-defined content-screening criteria using one or more program class or title, such processor further enabled to restrict or permit the conference by dynamically adding or removing a DTV user to or from one or more conferencing active set or selected logical group, whereby gaming and conferencing services are centrally integrated for personalized screening such that effectively the same processor that functionally overlays management or coordination of user access to the program according to privately pre-defined content-screening criteria using one or more program class or title for censoring or authorizing such access, also manages or coordinates user conferencing according to privately pre-defined active set or selected logical group for restricting or permitting such conferencing, such centralized integration of screening criteria being pre-definable privately by one or more pre-defining user for gaming or conferencing thereby enabling privately accessed personal gaming and conferencing services.

46. Application of claim 45 wherein:
one or more of the users is billable or receives an advertisement according to a controller for controlling user access to the program.

47. DTV integrated television gaming and conferencing console with centrally-integrated personalized screening of DTV content overlaid with conferencing comprising:
means for functionally-overlaid conferencing a first user with a DTV integrated television gaming and conferencing user for video, audio or text messaging or conferencing before, while or after a television or gaming program broadcast or data application is accessed commonly by both users from memory or via a network data interface or broadcast program channel, whereby such conference and common access are integrated functionally for management or coordination by a television or gaming access and user-conference controller coupled to users for delivering or enabling a combined broadband television gaming and conferencing service, the controller restricting or permitting one or more overlaid user access to the program or application from memory or via the network by censoring or authorizing one or more program or application selectively according to privately pre-defined content-screening criteria using one or more program or application class or title, such controller further enabled to restrict or permit the conference or message by dynamically adding or removing the DTV user to or from one or more conferencing or messaging active set or selected logical group, whereby television and conferencing or messaging services are centrally integrated for personalized screening such that effectively the same controller that functionally overlays management or coordination of user access to the program broadcast or data application according to privately pre-defined content-screening criteria using one or more program or application class or title for censoring or authorizing such access, also manages or coordinates user conferencing or messaging according to privately pre-defined active set or selected logical group for restricting or permitting such conferencing or messaging, such centralized integration of screening criteria being pre-definable privately by a pre-defining user for both television and conferencing or messaging thereby enabling privately accessed personal television and conferencing or messaging services.

48. Console of claim 47 wherein:
the program broadcast or data application comprises a video game or simulation program run locally by one or more users, whereby the controller bills one or more user for gaming or conferencing service.

49. Console of claim 47 wherein:
the controller or console identifies a user capability or address, program or data content, or actual or possible channel bandwidth congestion or network connection fault according to a program for restricting, redirecting, or reducing transmission of the conference or access.

50. Console of claim 47 wherein:
the controller or console runs software for searching for the program broadcast or data application for delivery to or access by a virtual audience of users authorized for such delivery or access.

51. Console of claim 47 wherein:
the controller directs a narrowcast message to one or more user for customized or personalized screen display or incentive messaging dynamically or adaptively according to user action or commercial attribute, wherein the commercial, advertisement or message is integrated, combined or mixed with or within the program broadcast or data application.

52. Console of claim 47 wherein:
the controller authorizes the combined service by authenticating a set-top box or interface device coupled via internet, cable, satellite, optical fiber, microwave, MMDS, LMDS, or wireless channel.

53. In a networked DTV device, a programmable broadband functionally-overlaid service software with centrally-integrated personalized screening of DTV content overlaid with conferencing comprising:
firmware or computer code for authorizing a functionally-overlaid conference between a first broadband subscriber unit and a DTV broadband subscriber unit before, while or after a program broadcast or data application is accessed from memory or via a network data interface or broadcast program channel by at least one subscriber unit, whereby both the conferencing and accessing are authorized by an integrated broadband service provider centrally coupled to such subscriber units, the service provider restricting or permitting one or more overlaid subscriber unit access to the program broadcast or data application from memory or via the network by censoring or authorizing one or more program or application selectively according to privately pre-defined content-screening criteria using one or more program or application class or title, such service provider further enabled to restrict or permit the conference by dynamically adding or removing the DTV unit to or from one or more conferencing active set or selected logical group, whereby DTV content and conferencing services are centrally integrated for personalized screening such that effectively the same service provider that functionally overlays management or coordination of subscriber access to the program or application according to privately pre-defined content-screening criteria using one or more program or application class or title for censoring or authorizing such access, also manages or coordinates conferencing according to privately pre-defined active set or selected logical group for restricting or permitting such conferencing, such centralized integration of screening criteria being pre-definable privately by a pre-defining subscriber for DTV content or conferencing thereby enabling privately accessed personal DTV content and conferencing services.

54. Software of claim 53 wherein:
the program broadcast or data application is selectable programmably according to a software search, whereby a message adapted to such search is integrated, combined or mixed with or within the common program broadcast or data application.

55. In an interactive system comprising a data management system for authorizing DTV subscriber service with centrally-integrated personalized screening of DTV content overlaid with conferencing, a database comprising:
a database representing one or more DTV subscriber account authorized to access a program or data for online broadband service, and conduct a functionally-overlaid conference between authorized subscribers while, after or before such subscribers access the program or data;
wherein a controller authorizes the access to both the program or data and the conference, the controller restricting or permitting one or more overlaid subscriber access to the program or data by censoring or authorizing one or more program or data selectively according to privately pre-defined content-screening criteria using one or more program or data class or title, such controller further enabled to restrict or permit the conference by dynamically adding or removing the DTV unit to or from one or more conferencing active set or selected logical group, whereby DTV content and conferencing services are centrally integrated for personalized screening such that effectively the same controller that functionally overlays management or coordination of subscriber access to the program or application according to privately pre-defined content-screening criteria using one or more program or application class or title for censoring or authorizing such access, also manages or coordinates conferencing according to privately pre-defined active set or selected logical group for restricting or permitting such conferencing, such centralized integration of screening criteria being pre-definable privately by a pre-defining subscriber for DTV content or conferencing thereby enabling privately accessed personal DTV content and conferencing services.

56. Database of claim 55 wherein:
the program or data comprises one or more multi-user gaming or digital television program or signal, whereby a plurality of authorized subscribers access in common the multi-user gaming or digital television program or signal, while, after or before the conference is conducted between the plurality of subscribers.

57. In an interactive network device for accessing a gaming program or data signal and conferencing with DTV interactive network device while, before or after accessing the same program or data signal, a method for integrating functionally-overlaid broadband service with centrally-integrated personalized screening of DTV content overlaid with conferencing comprising steps of:

outputting by a DTV network device interactively a gaming program or data signal; and integrating functionally in such output at least one participant accessing the gaming program or data signal, wherein a controller coupled centrally to each conferencing network device authorizes access by a plurality of participants to the gaming program or data signal while, before or after the authorized participants conduct a conference with each other, the controller restricting or permitting one or more overlaid participant access to the gaming program or data signal by censoring or authorizing one or more gaming program or data signal selectively according to privately pre-defined content-screening criteria using one or more program or data class or title, such controller further enabled to restrict or permit the conference by dynamically adding or removing the DTV device to or from one or more conferencing active set or selected logical group, whereby gaming and conferencing services are centrally integrated for personalized screening such that effectively the same controller that functionally overlays management or coordination of participant access to the gaming program or data signal according to privately pre-defined content-screening criteria using one or more program or data class or title for censoring or authorizing such access, also manages or coordinates conferencing according to privately pre-defined active set or selected logical group for restricting or permitting such conferencing, such centralized integration of screening criteria being pre-definable privately by a pre-defining participant for gaming or conferencing thereby enabling privately accessed personal gaming and conferencing services.

58. A set-top gaming device for coupling to a DTV media output with centrally-integrated personalized screening of DTV content overlaid with conferencing comprising:

a DTV set-top processor, and a network interface;

wherein the set-top processor enables a functionally-overlaid conference by a subscriber with another subscriber during, before or after access by both subscribers to a multi-subscriber gaming program; the media output generating an integration of one or more conferencing subscriber and the accessed gaming program, wherein a controller couples to the network interface for authorizing centrally the access and conference as a combined subscription service for on-line gaming community, the controller or processor restricting or permitting one or more overlaid subscriber access to the gaming program by censoring or authorizing one or more gaming program selectively according to privately pre-defined content-screening criteria using one or more program class or title, such controller or processor further enabled to restrict or permit the conference by dynamically adding or removing the DTV subscriber to or from one or more conferencing active set or selected logical group, whereby gaming and conferencing services are centrally integrated for personalized screening such that effectively the same controller or processor that functionally overlays management or coordination of subscriber access to the gaming program according to privately pre-defined content-screening criteria using one or more program or data class or title for censoring or authorizing such access, also manages or coordinates conferencing according to privately pre-defined active set or selected logical group for restricting or permitting such conferencing, such centralized integration of screening criteria being pre-definable privately by a pre-defining subscriber for gaming or conferencing thereby enabling privately accessed personal gaming and conferencing services.

* * * * *